April 3, 1956     R. HOLLINGSWORTH     2,740,392
FUEL CHARGE TURBULATOR FOR INTERNAL COMBUSTION ENGINES
Filed Nov. 16, 1954
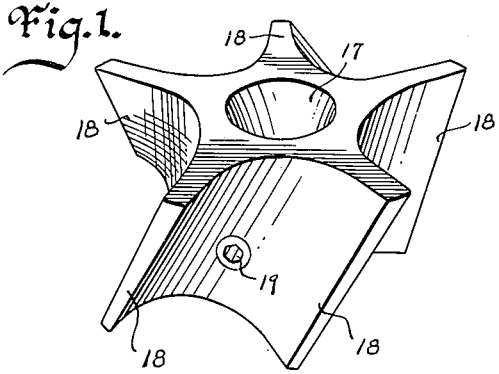
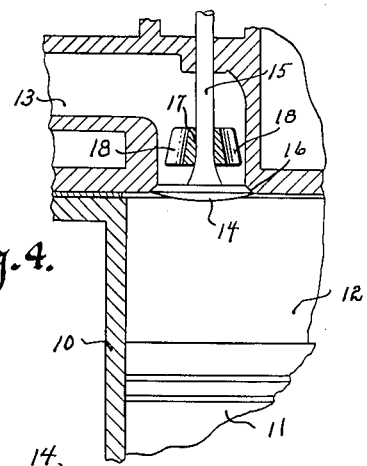
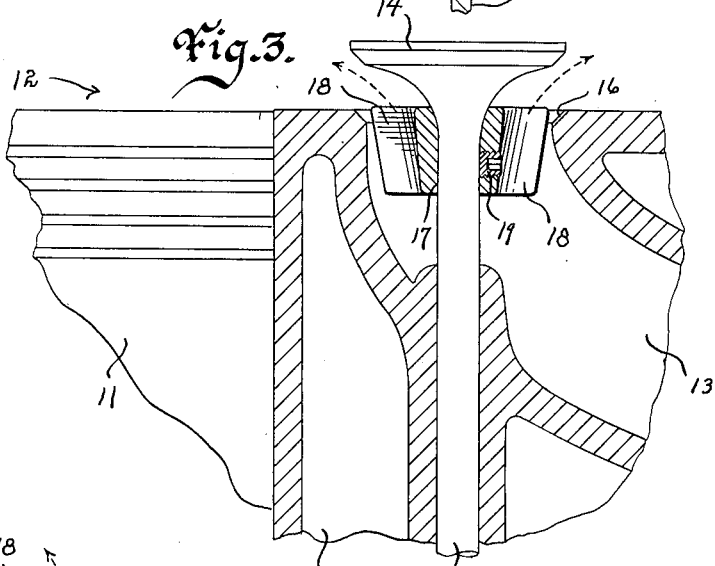
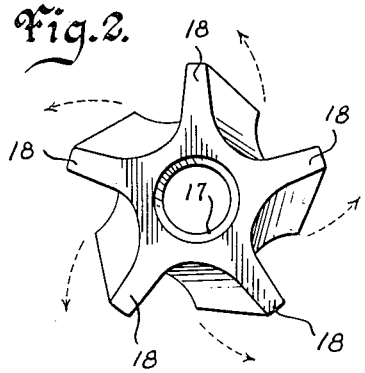
Inventor
Raphael Hollingsworth
by Talbert Dick & Adler
Attorneys
Witness
Edward P. Seeley

United States Patent Office 2,740,392
Patented Apr. 3, 1956

2,740,392

FUEL CHARGE TURBULATOR FOR INTERNAL COMBUSTION ENGINES

Raphael Hollingsworth, Richland, Iowa

Application November 16, 1954, Serial No. 469,172

6 Claims. (Cl. 123—142)

This invention relates to devices for improving the combustion in internal combustion engines and more particularly to means for increasing the turbulence of the fuel charge entering the combustion chamber.

Many devices are now used in connection with the engine carburetor to encourage the better mixing of the liquid fuel with the air supply. While such devices do improve the fuel mixture, they do not fill the combustion chamber, with an even uniform density of the mixture. There are at least three reasons for this improper filling of the combustion chamber with the fuel charge, i. e., incomplete mixing of the fuel and air, uneven heating of metal parts in the combustion chamber, and faulty and incomplete fuel filling of all areas within the combustion chamber.

Therefore, one of the principal objects of my invention is to provide a means for causing a vortex within the combustion chamber at time the fuel charge enters the same.

A further object of this invention is to provide a means for completing the uniform mixing of the fuel and air charge as it enters the combustion chamber of the engine.

A still further object of my invention is to provide a means for causing all areas within the combustion chamber to be filled with the fuel charge at substantially the same instant.

A still further object of my invention is to provide a fuel turbulator that keeps the various metal areas inside the combustion chamber in better temperature balance.

A still further object of my invention is to provide a device for giving more power, and better flexibility of internal combustion engines.

Still further objects of this invention are to provide a fuel turbulator for fuel charges entering the combustion chambers of engines, that is economical in manufacture, and durable in use.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Fig. 1 is a perspective view of my device prior to installation on the stem of an intake valve of an internal combustion engine.

Fig. 2 is a side sectional view of the fuel charge turbulator installed and with the intake valve in raised position, Fig. 3 is a top view of my device, detached from its intake valve, and Fig. 4 shows the device mounted on an overhead valve, and upon which it is most effective.

While I show my turbulator as attachable to and detachable from the stem of an intake valve, obviously it can be manufactured integral with the valve.

In the drawings, I use the numeral 10 to generally designate an internal combustion engine having the usual reciprocating piston 11, and combustion chamber area 12. The intake manifold is designated by the numeral 13. In Fig. 3 the intake valve is upright while in Fig. 4, the valve is reversed for an overhead valve engine. In either type of engine, I have designated the valve head by the numeral 14 and its stem by the numeral 15. The numeral 16 designates the valve seat. It is to such engines that I install my turbulator, and which I will now describe in detail. The turbulator per se is of one piece having a central cylinder bore 17 and a plurality of evenly spaced apart spiraling fin portions 18, as shown in Fig. 2. The device is placed on the valve stem to embrace the same directly adjacent the valve head, as shown in the drawings. The device may be secured thereto and in place by any suitable means such as a set screw means 19. Of course, if the turbulator is formed on the stem at time of manufacture, no auxiliary fastening means is needed.

By this arrangement of parts, directly to the rear of the valve head will be a plurality of radially extending fins 18, with their widths extending at an angle to the longitudinal axis of the valve stem. Thus, the spiraling vanes 18 will reside in the longitudinal flow path of the fuel charge as it passes into the combustion chamber when the intake valve is opened. These fins or flange baffle vanes 18 will impart to the incoming fuel charge, a spiraling, twisting turbulence, as the same enters the combustion chamber. Inasmuch as the valve is only open a short period of time, the velocity of the fuel charge is most high, and will be effected at maximum efficiency by the spiraling passageways created by the fins 18. The result will be a vicious turbulence of the gases and of cyclonic proportions within the combustion chamber. The fuel charge will be further mixed by such violent agitation and most effective results will be obtained because the mixing will be in the presence of the hot walls of the combustion chamber. At time of explosion the charge will not only be uniformly mixed, but will be heated and gasified. This will mean more power for a given amount of fuel. Combustion will be more complete and this will mean a cleaner engine and reduced engine knock.

I have found that after installing my turbulators on the intake valves of an internal combustion engine, the idling jets can be set at a much lower rate of volume of gasoline while the engine horse power output is increased. The fuel charge entering the combustion chamber will be whirling with great velocity thereby contacting all of the walls of the combustion chamber. This will make not only a cooler running engine but all parts will be more uniformly cooled. Still another advantage is that all areas of the combustion chamber will be successfully filled with the fuel mixture with the result that the explosion will be on time and will be uniform throughout the combustion area. This is one of the reasons that an engine equipped with my device will develop greater horse power than one not having my turbulating equipment. Also the resultant vortex of the fuel charge will increase its mixing and gasification. Furthermore, I have found by the use of my device cheaper gasoline may be used.

Some changes may be made in the construction and arrangement of my fuel charge turbulator for internal combustion engines without departing from the real spirit and purpose of my invention, and it is my intention to cover by my claims, any modified forms of structure or use of mechanical equivalents which may be reasonably included within their scope.

I claim:

1. In combination, an internal combustion engine having a combustion chamber, a valve stem, a valve head, an intake manifold and a valve seat communicating with the combustion chamber and intake manifold, and a plurality of radially extending fins rigidly fixed on said valve stem having their widths at an angle to the longitudinal axis of said valve stem.

2. In combination, an internal combustion engine having a combustion chamber, a valve stem, a valve head, an intake manifold and a valve seat communicating with the combustion chamber and intake manifold, and a plurality of radially extending evenly spaced apart fins rigidly fixed on said valve stem having their widths at an angle to the longitudinal axis of said valve stem.

3. In combination, an internal combustion engine having a combustion chamber, a valve stem, a valve head, an intake manifold and a valve seat communicating with the combustion chamber and intake manifold, and a plurality of radially extending fins rigidly fixed on said valve stem and to move with said valve stem having their widths at an angle to the longitudinal axis of said valve stem and positioned directly back of said valve head.

4. In combination, an internal combustion engine having a combustion chamber, a valve stem, a valve head, an intake manifold and a valve seat communicating with the combustion chamber and intake manifold, and a plurality of spiraling fins rigidly fixed on said valve stem and to move with said valve stem and back of said valve head.

5. In combination, an internal combustion engine having a combustion chamber, a valve stem, a valve head, an intake manifold and a valve seat communicating with the combustion chamber and intake manifold, and a member on said valve stem having angular fins extending therefrom and moving with said valve stem.

6. In a turbulator adapted to be rigidly secured around the stem of the intake valve of an internal combustion engine and to move with the same, a cylindrical portion adapted to embrace the stem of an intake valve, and a plurality of fins extending from said cylindrical portion and having their widths progressing at an angle to said cylindrical portion.

References Cited in the file of this patent

UNITED STATES PATENTS

| 1,638,585 | Lathrop | Aug. 9, 1927 |
| 1,770,645 | Heaton | July 15, 1930 |
| 2,017,043 | Galliot | Oct. 15, 1935 |
| 2,384,681 | Janes | Sept. 11, 1945 |

FOREIGN PATENTS

| 704,742 | France | May 26, 1931 |